US010937322B2

(12) United States Patent
Takahashi et al.

(10) Patent No.: US 10,937,322 B2
(45) Date of Patent: Mar. 2, 2021

(54) CONTROL DEVICE FOR LANE DEPARTURE WARNING DEVICE, VEHICLE, AND LANE DEPARTURE WARNING CONTROL METHOD (71) Applicant: Isuzu Motors Limited, Tokyo (JP)

(72) Inventors: Naoki Takahashi, Chigasaki (JP); Masaichi Takahashi, Yokohama (JP)

(73) Assignee: Isuzu Motors Limited, Tokyo (JP)

( * ) Notice: Subject to any disclaimer, the term of this patent is extended or adjusted under 35 U.S.C. 154(b) by 22 days.

(21) Appl. No.: 16/496,434

(22) PCT Filed: Mar. 19, 2018

(86) PCT No.: PCT/JP2018/010843
§ 371 (c)(1),
(2) Date: Sep. 22, 2019

(87) PCT Pub. No.: WO2018/174017
PCT Pub. Date: Sep. 27, 2018

(65) Prior Publication Data
US 2020/0242940 A1 Jul. 30, 2020

(30) Foreign Application Priority Data
Mar. 23, 2017 (JP) .................. 2017-057813

(51) Int. Cl.
G08G 1/16 (2006.01)
B60W 30/12 (2020.01)
(Continued)

(52) U.S. Cl.
CPC ............... G08G 1/167 (2013.01); B60Q 1/44 (2013.01); B60W 30/12 (2013.01); G06K 9/00798 (2013.01)

(58) Field of Classification Search
CPC ...... G08G 1/167; B60W 30/12; B60W 50/14; G06K 9/00798; B60Q 1/00; B60Q 1/44;
(Continued)

(56) References Cited

U.S. PATENT DOCUMENTS 9,371,002 B2 * 6/2016 Braunberger .......... B60K 31/00
9,868,385 B2 * 1/2018 Braunberger .......... B60Q 1/442
(Continued)

FOREIGN PATENT DOCUMENTS

JP 2003-058993 2/2003
JP 2006-069323 3/2006
(Continued)

OTHER PUBLICATIONS

International Search Report and the Written Opinion dated May 1, 2018 From the International Searching Authority Re. Application No. PCT/JP2018/010843 and Its Translation of Search Report Into English. (6 Pages).

*Primary Examiner* — Rufus C Point (57) ABSTRACT

The present invention is configured such that a control device for a lane departure warning device that outputs a warning on the basis of the position relationship of a vehicle and a lane boundary line is equipped with a detection unit for detecting a switch of a brake from on to off, and a warning control unit for, when the detection unit has detected said switch, changing a warning threshold value to which vehicle position information is compared in the determination of whether or not to issue a warning to a value at which a warning is less likely to be issued as compared to when the detection unit has not detected said switch. The present invention thereby provides a control device for a lane departure warning device that is capable of reducing warnings which could be an annoyance to drivers.

7 Claims, 6 Drawing Sheets (51) Int. Cl.
 *B60Q 1/44* (2006.01)
 *G06K 9/00* (2006.01)

(58) Field of Classification Search
 CPC .................. B60Q 1/486; B60Q 1/488; G05B 2219/43077
 See application file for complete search history.

(56) References Cited

U.S. PATENT DOCUMENTS

| | | | |
|---|---|---|---|
| 10,220,765 B2* | 3/2019 | Braunberger | B60Q 1/08 |
| 2008/0015778 A1* | 1/2008 | Matsuura | G08G 1/167 |
| | | | 701/301 |
| 2008/0189000 A1* | 8/2008 | Duong | B60T 7/22 |
| | | | 701/20 |
| 2009/0203498 A1* | 8/2009 | Lingman | B60T 17/221 |
| | | | 477/183 |
| 2012/0265418 A1* | 10/2012 | Foerster | B60W 30/09 |
| | | | 701/70 |
| 2013/0141231 A1* | 6/2013 | Aberizk | B60T 7/10 |
| | | | 340/467 |
| 2015/0061492 A1* | 3/2015 | Braunberger | B60K 31/00 |
| | | | 315/82 |
| 2017/0240186 A1* | 8/2017 | Hatano | B60W 30/09 |
| 2018/0037224 A1* | 2/2018 | Bogner | B60W 10/20 |
| 2019/0054928 A1* | 2/2019 | Hatano | B60W 60/0057 |
| 2019/0071098 A1* | 3/2019 | Asakura | B60W 30/025 |
| 2020/0027353 A1* | 1/2020 | Takahashi | B60W 50/16 |

FOREIGN PATENT DOCUMENTS

| | | |
|---|---|---|
| JP | 2007-008332 | 1/2007 |
| JP | 2009-116693 | 5/2009 |
| JP | 2013-244767 | 12/2013 |
| WO | WO 2018/174017 | 9/2018 |

* cited by examiner

CONTROL DEVICE FOR LANE DEPARTURE WARNING DEVICE, VEHICLE, AND LANE DEPARTURE WARNING CONTROL METHOD

RELATED APPLICATIONS

This application is a National Phase of PCT Patent Application No. PCT/JP2018/010843 having International filing date of Mar. 19, 2018, which claims the benefit of priority of Japanese Patent Application No. 2017-057813 filed on Mar. 23, 2017. The contents of the above applications are all incorporated by reference as if fully set forth herein in their entirety.

FIELD AND BACKGROUND OF THE INVENTION

The present disclosure relates to a control device for a lane departure warning device, a vehicle, and a lane departure warning control method.

Conventionally, there is a lane departure warning device that determines whether or not a vehicle departs from a lane, on the basis of a detection signal of a steering wheel angle sensor, a camera, a speed sensor, or the like. For example, a lane departure warning device disclosed in PTL 1 issues a warning, when detecting a state in which a vehicle departs from a lane. Consequently, a warning of the departure from the lane is given to a driver.

CITATION LIST

Patent Literature

PTL 1
Japanese Patent Application Laid-Open No. 2013-244767

SUMMARY OF THE INVENTION

Technical Problem

In the case of the aforementioned lane departure warning device, even in a situation in which a warning is unnecessary to driver, the warning is sometimes issued. There is a possibility that the driver feels troublesomeness of such a warning.

An object of the present disclosure is to provide a control device for a lane departure warning device, a vehicle, and a lane departure warning control method capable of reducing a warning causing a driver to feel troublesomeness.

Solution to Problem

One aspect of a control device for a lane departure warning device, according to the present disclosure is a control device that outputs a warning based on positional relationship between a vehicle and a lane boundary line, the control device for a lane departure warning device, including: a detection section that detects switching from an ON state to an OFF state of a brake; and a warning control section that changes a warning threshold value to a value at which the warning is less likely to be output compared to a case in which the detection section does not detect the switching, once the detection section detects the switching, the warning threshold value being to be compared with position information of the vehicle in determination as to whether or not the warning is output.

One aspect of a vehicle according to the present disclosure includes the control device for a lane departure warning device, described above.

One aspect of a lane departure warning control method according to the present disclosure is a method performed in a vehicle, the lane departure warning control method for outputting a warning based on positional relationship between the vehicle and lane boundary line, the lane departure warning control method including: detecting occurrence of switching from an ON state to an OFF state of a brake; and changing a warning threshold value to a value at which the warning is less likely to be output compared to a case in which occurrence of the switching is not detected, in a case in which the occurrence of the switching is detected, the warning threshold value being to be compared with position information of the vehicle in determination as to whether or not the warning is output.

Advantageous Effects of Invention

According to the present disclosure, it is possible to reduce a warning causing a driver to feel troublesomeness.

DESCRIPTION OF SPECIFIC EMBODIMENTS OF THE INVENTION

1. Embodiment

Hereinafter, a control device for a lane departure warning device according to an embodiment of the present disclosure will be described with reference to the drawings. Components, the names and the functions of which are the same, are denoted by the same reference numerals, so that description will be made without repeating respective details thereof.

1.1 Lane Departure Warning Device

Figure 1:
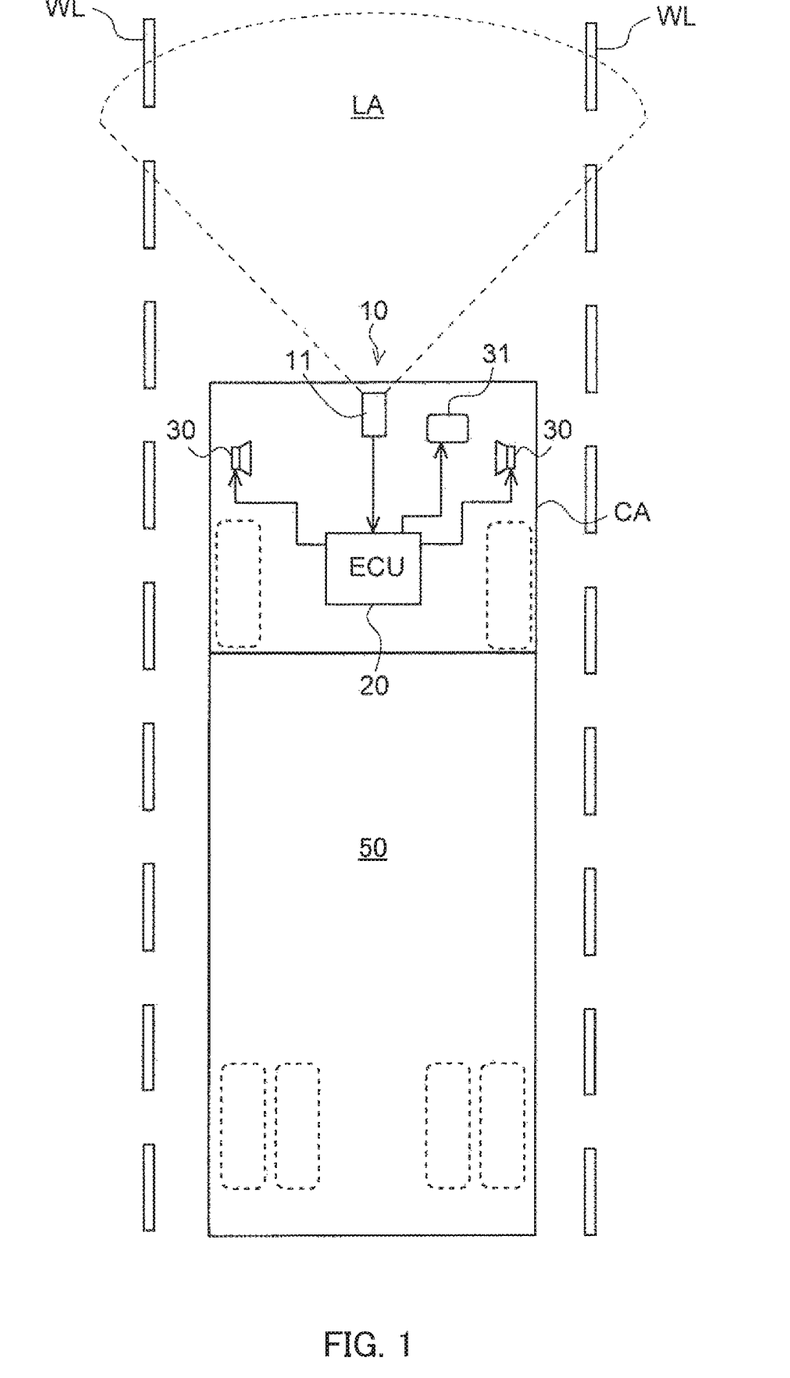
FIG. 1 is a schematic configuration diagram illustrating an example of a vehicle mounted with a lane departure warning device incorporating a control device according to an embodiment of the present disclosure.

FIG. 1 is a schematic configuration diagram illustrating an example of vehicle 50 mounted with lane departure warning device 10 incorporating electronic control unit 20 that is the control device according to this embodiment.

First, lane departure warning device 10 will be described with reference to FIG. 1. Lane departure warning device 10 is mounted on vehicle 50 (large vehicle) such as a truck, and includes CCD camera 11, electronic control unit (hereinafter simply referred to as an "ECU") 20, speakers 30 that issue acoustic warnings, and display device 31 that issues a display warning.

[1.1.1 CCD Camera]

CCD camera 11 is provided at a front portion of cab CA of vehicle 50. CCD camera 11 images lane boundary lines WL such as white lines and yellow lines on a road surface that divide traveling lane LA of vehicle 50, and transmits the imaged image to ECU 20. A section that detects a lane boundary line is not limited to CCD camera 11, and other known imaging devices, such as a CMOS image sensor, may be applied.

[1.1.2 ECU (Control Device)]

ECU 20 performs various control of vehicle 50, and includes known a CPU, a ROM, a RAM, an input port, an output port, and the like. ECU 20 is an example of the control device for the lane departure warning device according to this embodiment. Accordingly, in the following description, ECU 20 will be described as the control device for the lane departure warning device according to this embodiment.

Figure 2:
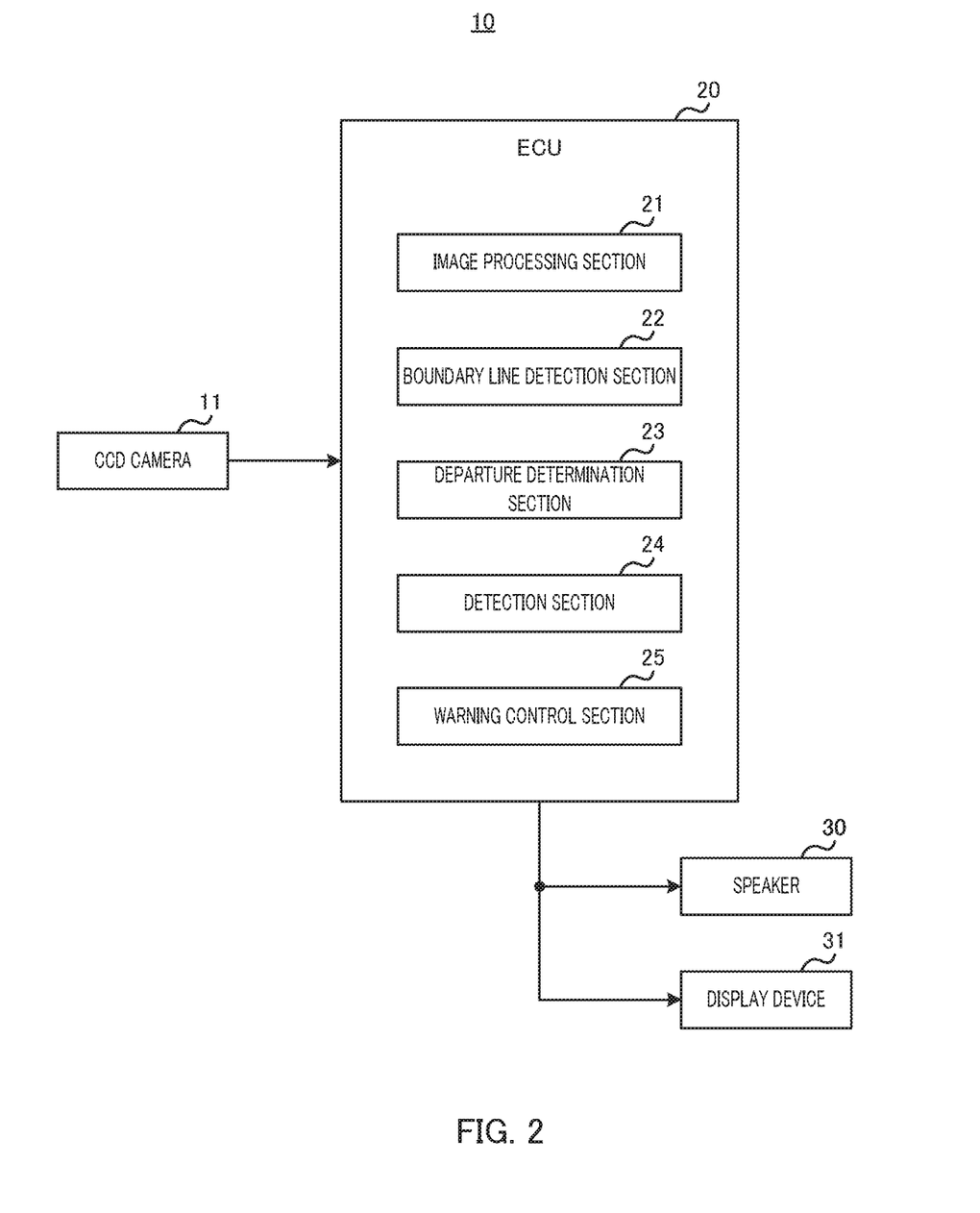
FIG. 2 is a functional block diagram illustrating an electronic control unit for the lane departure warning device.

As illustrated in FIG. 2, ECU 20 includes image processing section 21, boundary line detection section 22, departure determination section 23, detection section 24, and warning control section 25, as part of the functional elements. Description will be made while these respective functional elements are included in ECU 20 being an integrated hardware. However, any of these can be provided in separate hardware.

Image processing section 21 generates a lane boundary line image for recognizing a white line, a yellow line, and the like for dividing traveling lane LA, by applying an image process such as edge extraction to image data received from CCD camera 11.

Boundary line detection section 22 processes the image obtained in image processing section 21 to detect lane boundary lines WL.

Departure determination section 23 determines whether or not vehicle 50 departs from traveling lane LA to outside of detected lane boundary lines WL. Additionally, departure determination section 23 can determine, that is, predict whether or not vehicle 50 is to depart from traveling lane LA to outside of detected lane boundary lines WL.

Departure determination section 23 determines whether or not vehicle 50 departs from traveling lane LA, on the basis of relationship between a distance from each lane boundary line WL of vehicle 50, and warning threshold value $D_{TH}$. Alternatively, departure determination section 23 can determine (that is, predict) whether or not vehicle 50 is to depart from traveling lane LA, on the basis of relationship between a distance from each lane boundary line WL of vehicle 50, and warning threshold value $D_{TH}$.

Detection section 24 performs detection regarding a state of an auxiliary brake (not illustrated) in vehicle 50. Specifically, detection section 24 detects switching from an ON state to an OFF state of the auxiliary brake, on the basis of output of a brake sensor (not illustrated) for the aforementioned auxiliary brake provided in vehicle 50.

Detection section 24 can also detect the ON state/OFF state of the auxiliary brake.

Example of the auxiliary brake include various auxiliary brakes such as an exhaust brake, a compression pressure release brake, and a retarder. The brake sensor for the auxiliary brake outputs information regarding ON/OFF of a switch of the auxiliary brake, for example. Such a brake sensor is similar to conventionally known various brake sensors. Therefore, description of the auxiliary brake and the brake sensor will be omitted.

Detection section 24 repeatedly performs the aforementioned detection at predetermined intervals. A method for acquiring output of the brake sensor by detection section 24 is not particularly limited. Detection section 24 may actively acquire output of the brake sensor, or may passively receive the output of the brake sensor.

Once detection section 24 detects the aforementioned switching, detection section 24 transmits, to warning control section 25, a signal indicating that the aforementioned switching is detected. Additionally, detection section 24 may transmit information regarding an ON state/OFF state of an auxiliary brake to warning control section 25. Warning control section 25 may actively acquire a detection result of detection section 24. Thus, a method for delivering information regarding the detection result of detection section 24 between detection section 24 and warning control section 25 is not particularly limited.

When it is determined by departure determination section 23 that vehicle 50 departs from traveling lane LA, warning control section 25 outputs a lane departure warning from warning control section 25. When departure determination section 23 predicts that vehicle 50 is to depart from traveling lane LA, warning control section 25 may output a lane departure warning from warning control section 25.

The lane departure warning from warning control section 25 which includes acoustic warnings by speakers 30 serving as a warning section, and a display warning (for example, letters, a lamp, or the like) by display device 31 serving as a warning section are output. The lane departure warning is not limited to the acoustic warning and the display warning, but may be, for example, warning torque such as vibration of a steering wheel.

On the other hand, once detection section 24 detects switching from the ON state to the OFF state of the auxiliary brake, warning control section 25 changes warning threshold value $D_{TH}$ to be used to determine whether or not the lane departure warning is output, to a value at which the lane departure warning is unlikely to be output compared with a usual state (hereinafter, referred to as a "changed warning threshold value"). Such change of warning threshold value $D_{TH}$ is performed, for example, until predetermined time elapses from a time point of the aforementioned switching.

Specifically, once detection section 24 detects the aforementioned switching, warning control section 25 changes warning threshold value $D_{TH}$, which is a threshold value to be used for determination of departure of vehicle 50 by departure determination section 23, to a value larger than a value in the usual state, until predetermined time elapses from a time point of the aforementioned switching.

The aforementioned change can be adjusted in accordance with a method for determining departure of departure determination section 23. For example, when it is determined by departure determination section 23 whether or not vehicle 50 departs, warning threshold value $D_{TH}$ is set to as a departure distance from traveling lane LA, and therefore warning threshold value $D_{TH}$ is set to a value larger than the usual value.

Once detection section 24 detects newly performed switching from the ON state to the OFF state of the auxiliary brake in a state in which the warning threshold value is changed (hereinafter referred to as a "threshold change state"), warning control section 25 may maintain the threshold change state until predetermined time elapses from a time point of the aforementioned newly performed switching.

Warning control section 25 may use a changed warning threshold as the warning threshold value during detection of the ON state of the auxiliary brake by value detection section 24

Figure 7A:
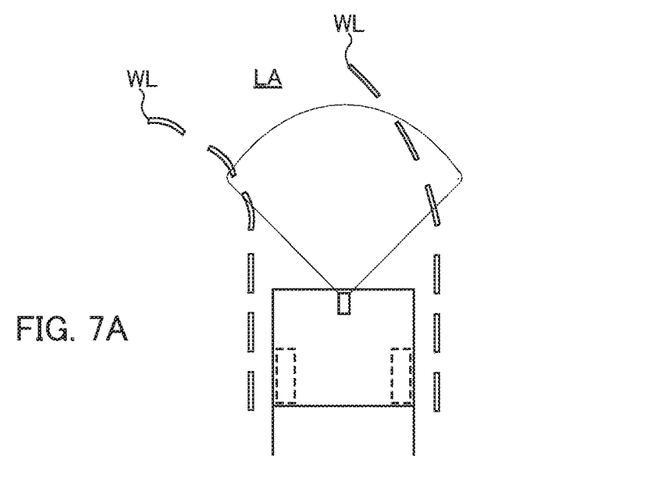
FIG. 7A is a schematic diagram illustrating a state immediately before a vehicle enters a curve.
Figure 7B:
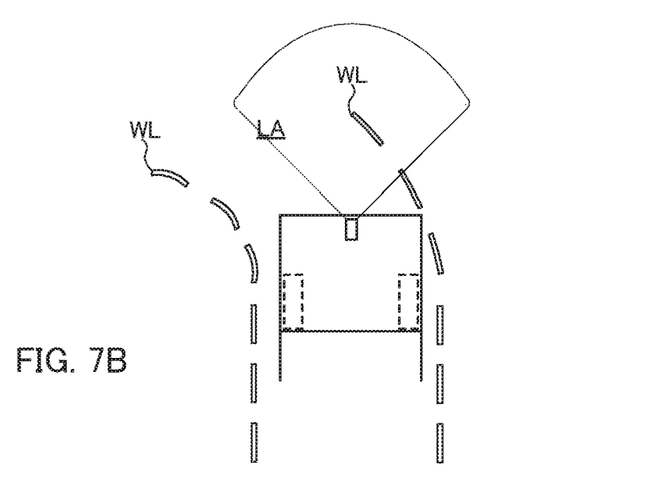
FIG. 7B is schematic diagram illustrating a state in which the vehicle enters the curve.
Figure 7C:
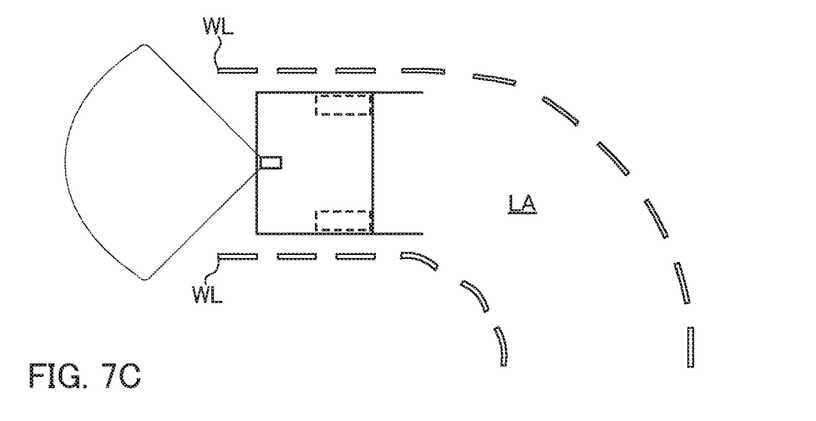
FIG. 7C is a schematic diagram illustrating a state in which the vehicle escapes from the curve.

The predetermined time is not limited to a preset fixed value. For example, the predetermined time may be appropriately set in relation to a driving situation (for example, a road situation, a vehicle speed or the like). In a case in which vehicle 50 is traveling on a curve as an example of the driving situation, the length of time before vehicle 50 gets out of the curve (from the state of FIG. 7A to the state of FIG. 7C) may be the predetermined time. Alternatively, in a case in which vehicle 50 is traveling on a construction zone (not illustrated) as another example of the driving situation, the length of time before vehicle 50 gets out of the construction zone may be the predetermined time.

1.2 Control Operation

Figure 3:
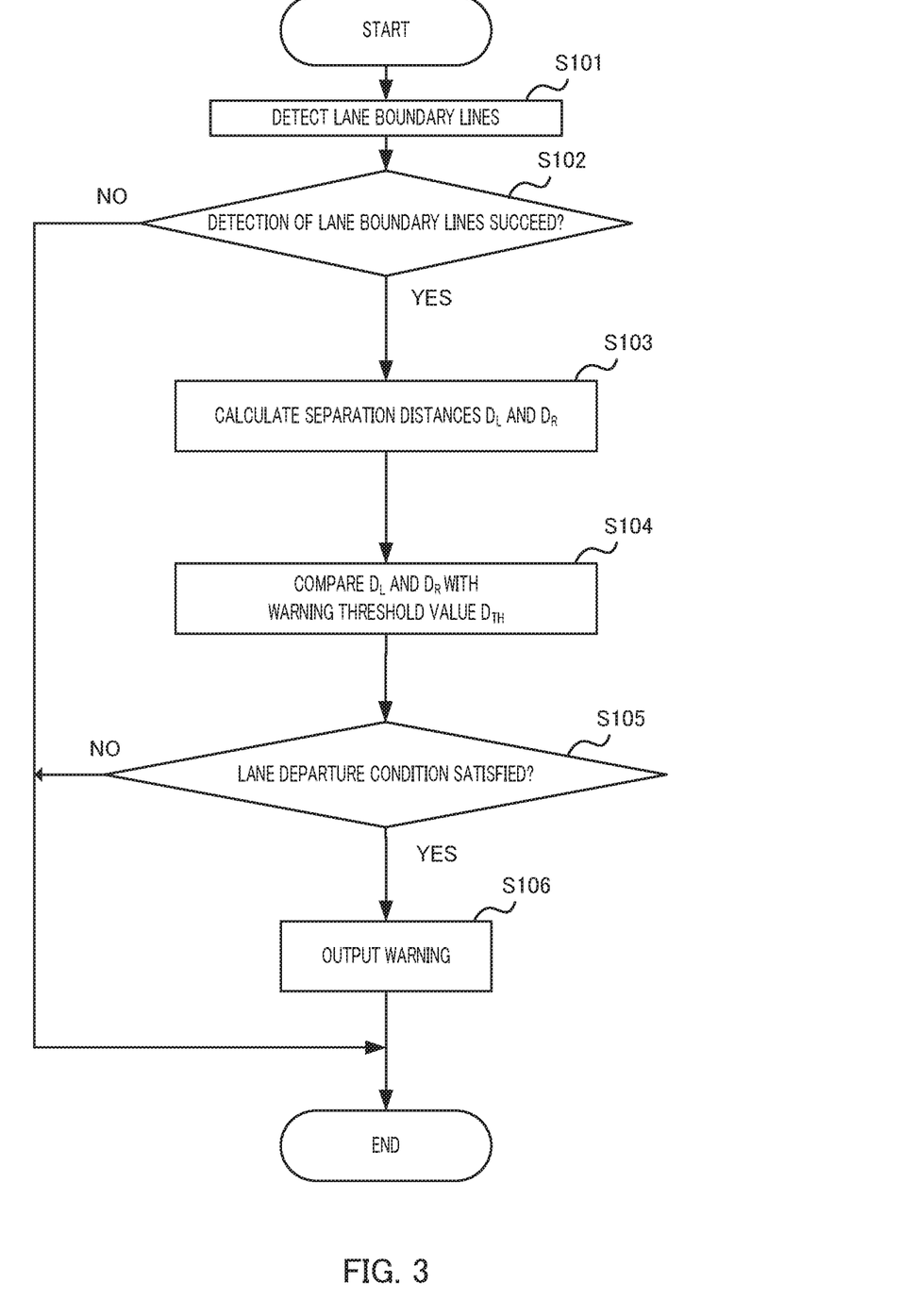
FIG. 3 is a flowchart illustrating control operation of the lane departure warning device.

Now, the control operation of the lane departure warning, and the operation of the warning suppression control performed by the lane departure warning device 10, as described above, will be described. FIG. 3 is a flowchart illustrating the control operation of the lane departure warning performed by the lane departure warning device 10.

Figure 4:
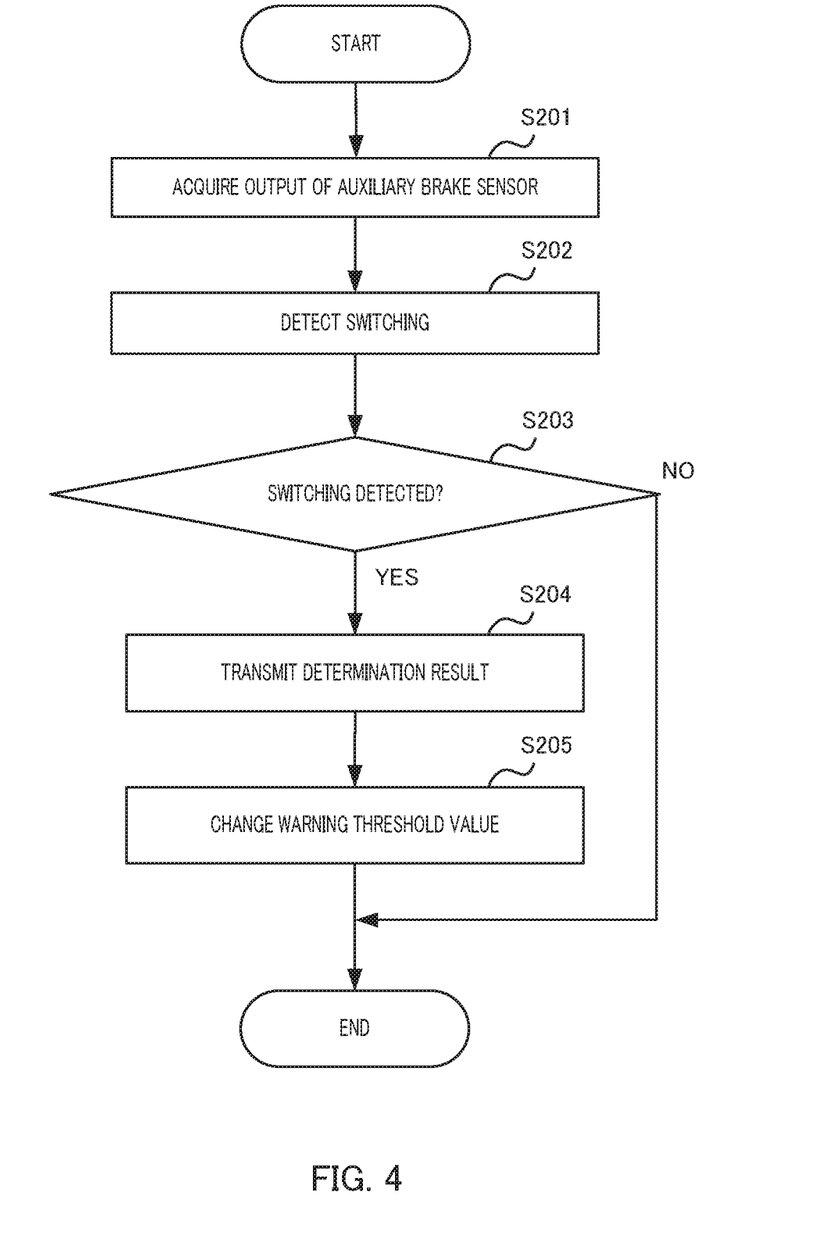
FIG. 4 is a flowchart illustrating operation of threshold change control.

FIG. 4 is a flowchart illustrating operation of the warning suppression control performed by the lane departure warning device 10. The control operation of the lane departure warning and the operation of the warning suppression control are repeatedly performed at a fixed cycle in ECU 20.

Figure 5:
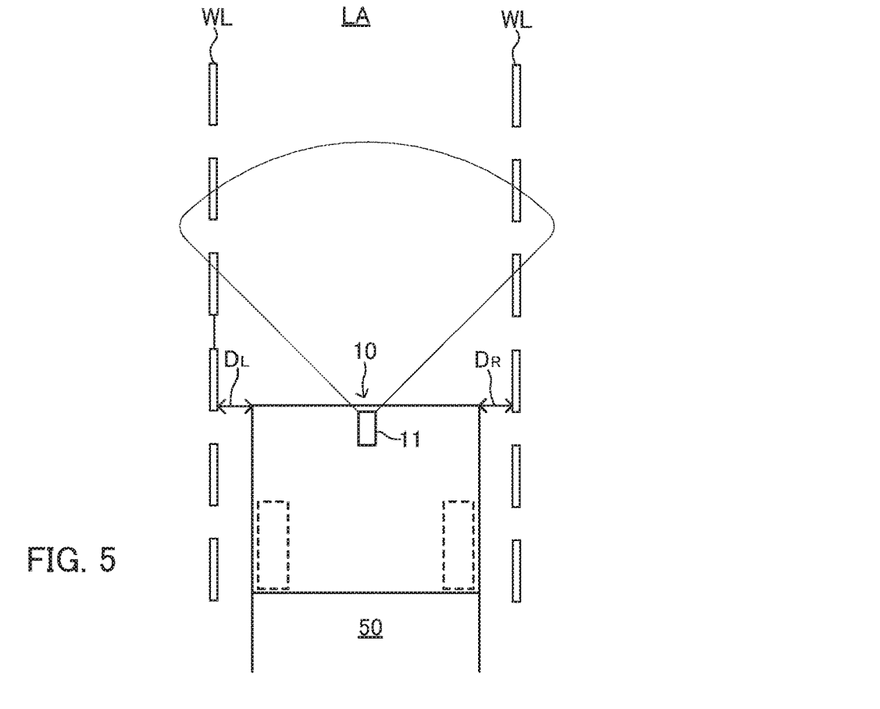
FIG. 5 is a schematic diagram illustrating a first traveling scene example.
Figure 6:
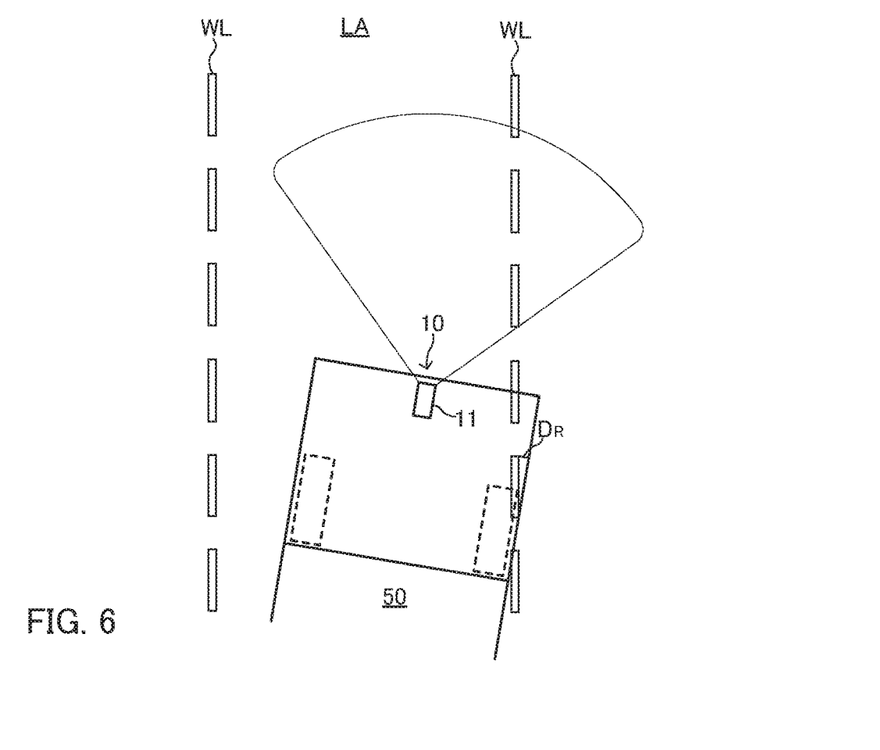
FIG. 6 is a schematic diagram illustrating a second traveling scene example.

FIGS. 5 and 6 are respective schematic diagrams illustrating two examples related to traveling scenes of a vehicle. In the following description, respective control operation examples in the flowcharts of FIGS. 3 and 4 that are applied to first and second traveling scene examples illustrated in FIGS. 5 and 6 are described.

First, control operation in the first traveling scene example illustrated in FIG. 5 will be described. In the first traveling scene example, in a situation in which lane boundary lines on both sides can be identified, a vehicle travels in linear traveling lanes. That is, the first traveling scene example is a usual traveling state.

In the flowchart illustrated in FIG. 3, boundary line detection section 22 detects lane boundary lines WL in Step S101, and a control process shifts to next Step S102.

In Step S102 shifted from Step S101, whether or not detection of lane boundary lines WL succeeds is determined.

There is a scene in which identification of lane boundary lines WL on the both side is difficult, depending on the traveling scene. In this case, boundary line detection section 22 cannot detect lane boundary lines WL on the both sides of vehicle 50 ("NO" in Step S102), and therefore the control process of the lane departure warning is ended.

That is, in a case in which lane boundary lines WL on the both sides are not detected, a process of determining whether or not a lane departure condition described below is satisfied (Step S105) is skipped. As a result, the lane departure warning is not output.

In the first traveling scene example illustrated in FIG. 5, the vehicle is traveling on the traveling lanes in a situation in which the lane boundary lines on the both sides can be identified. In this case, in Step S102, boundary line detection section 22 can detect lane boundary lines WL on the both sides ("YES" in Step S102), and therefore the control process shifts from Step S102 to Step S103.

In Step S103 shifted from Step S102, a separation distance to each of lane boundary lines WL on the both sides detected by boundary line detection section 22 is calculated. Herein, separation distance $D_L$ to left lane boundary line WL from vehicle 50 is calculated, separation distance $D_R$ to right lane boundary line WL from vehicle 50 is calculated, and the control process shifts to Step S104. Separation distance $D_L$ and separation distance $D_R$ are an example of a position information of vehicle 50.

In Step S104 shifted from Step S103, detected separation distances $D_L$, $D_R$ to lane boundary lines WL on the both sides are compared with warning threshold value $D_{TH}$ previously stored in departure determination section 23.

Specifically, in Step S104, in a case in which separation distance $D_L$ or separation distance $D_R$ is larger than warning threshold value $D_{TH}$, it is determined that the lane departure condition is satisfied. On the other hand, in a case in which separation distance $D_L$ or separation distance $D_R$ is smaller than warning threshold value $D_{TH}$, it is determined that the lane departure condition is not satisfied.

In a case in which separation distance $D_L$ is larger than warning threshold value Din, it is determined that vehicle 50 departs outside left lane boundary line WL of FIG. 5. On the other hand, in a case in which separation distance $D_R$ is larger than warning threshold value $D_{TH}$, it is determined that vehicle 50 departs outside right lane boundary line WL of FIG. 5.

In this embodiment, in a case in which a predetermined condition is satisfied, warning threshold value Dm is chanted to a value larger than a usual value. Hereinafter, control operation of threshold change control for changing warning threshold value $D_{TH}$ will be described with reference to FIG. 4.

FIG. 4 is a flowchart illustrating an example of the control operation of the threshold change control. In a case of this embodiment, the threshold change control is performed by another flow of the control operation of the lane departure warning. However, the threshold change control may be performed as a part of the control operation of the lane departure warning illustrated in FIG. 3.

First, a summary of the threshold change control illustrated in FIG. 4 will be described. The threshold change control is control for changing warning threshold value $D_{TH}$ to be used to determine whether or not the lane departure warning is output, to a value at which the lane departure warning is unlikely to be output as compared to the usual state (a value larger than a usual value in the case of this embodiment), by warning control section 25, once detection section 24 detects switching from the ON state to the OFF state of the auxiliary brake.

Specifically, first, in Step S201, detection section 24 acquires output information of a brake sensor.

In S202 shifted from Step S201, detection section 24 detects switching from the ON state to the OFF state of the auxiliary brake, on the basis of the acquired output information of the brake sensor. A method for detecting the aforementioned switching is not particularly limited.

In S203 shifted from Step S202, detection section 24 determines whether or not the aforementioned switching is detected.

When it is determined that the aforementioned switching is not detected Step S203 ("NO" in Step S203), the threshold change control is ended. In this case, detection section 24 may transmit, to warning control section 25, information indicating that the aforementioned switching is not detected.

When it is determined that the aforementioned switching is detected in Step S203 ("YES" in Step S203), the process shifts to Step S204.

In S204 shifted from Step S203, the information indicating that the aforementioned switching is detected is transmitted from detection section 24 to warning control section 25.

When receiving information indicating that the aforementioned switching is detected, warning control section 25 changes warning threshold value $D_{TH}$ to a value larger than the usual value by a predetermined value during predetermined time from at a time point of the aforementioned switching in Step S205.

As described above, warning threshold value Dm is used to determine whether or not warning control section 25 outputs the lane departure warning (in other words, determine whether or not vehicle 50 departs). Accordingly, a condition for determining whether or not the lane departure warning is output (in other words, determining whether or not vehicle 50 departs) is loosened compared to the usual state by change of warning threshold value Din. That is, the lane departure warning is unlikely to be output compared to the usual state.

In Step S205, in a case in which warning threshold value $D_{TH}$ is already changed, warning control section 25 may control such that changed warning threshold value $D_{TH}$ is maintained during the aforementioned predetermined time from a time point when the aforementioned newly performed switching is detected.

The operation of the threshold change control as described above is repeatedly performed at a fixed cycle in ECU 20. After the aforementioned predetermined time elapses from the time point when the aforementioned switching is detected, warning threshold value $D_{TH}$ is returned to the usual value. This control is also performed by warning control section 25.

In Step S105 illustrated in FIG. 3, it is determined whether or not the lane departure condition is satisfied, on the basis of warning threshold value $D_{TH}$ controlled as described above.

Then, the control process is shifted from Step S104 to Step S105. The value of usual warning threshold value Din, and the value of changed warning threshold value $D_{TH}$ may be respective predetermined values, or may be changed to be set by user operation.

In Step S105 shifted from Step S104, departure determination section 23 determines whether or not the lane departure condition is satisfied. Herein, in the first traveling scene example illustrated in FIG. 5, the lane departure condition is not satisfied ("NO" in Step S105), and therefore the control process is ended. In this case, the lane departure warning is not issued.

Now, control operation example in the second traveling scene example illustrated in FIG. 6 will be described. In the second traveling scene example, in a situation in which lane boundary lines WL on the both sides can be identified, vehicle 50 starts departing outside lane boundary line WL on one side (right side).

In this case, a control process from Step S101 to Step S105 is similar to the control process in the first traveling scene example.

In the second traveling scene example illustrated in FIG. 6, warning threshold value Dm is changed by the aforementioned threshold change control. In the second traveling scene example, separation distance $D_R$ is larger than changed warning threshold value Din. Therefore, a comparison result in Step S104 satisfies the lane departure condition. Therefore, in Step S105, it is determined that the lane departure condition is satisfied ("YES" in Step S105). Accordingly, the control process shifts to Step S106.

In Step S106 shifted from Step S105, an output process of the lane departure warning is performed by warning control section 25. When the lane departure warning is output from warning control section 25, acoustic warnings by speakers 30, and a display warning (for example, letters, a lamp, and the like) by display device 31 are output.

In the second traveling scene example illustrated in FIG. 6, also in a case in which warning threshold value Dm is the usual value, separation distance $D_R$ is larger than warning threshold value $D_{TH}$. Also in this case, it is determined that the lane departure condition is satisfied in Step S105, and the output process of the lane departure warning is performed by warning control section 25 in Step S106.

1.3 Action and Effects of this Embodiment

Hereinafter, action and effects of this embodiment will be described. First, in a situation in which a driver switches the auxiliary brake from an ON state to an OFF state, it is considered that the driver intentionally operates the vehicle, and therefore even in a case in which vehicle 50 departs from traveling lane LA, a lane departure warning is often unnecessary. On the other hand, in this embodiment, once detection section 24 detects switching from the ON state to the OFF state of the auxiliary brake, warning threshold value $D_{TH}$ is set to the value larger than the usual value, so that a warning is unlikely to be output compared to a usual state. Consequently, the frequency of warnings that causes a driver to feel troublesomeness is reduced. In this embodiment, in a case in which the vehicle departs more largely compared to changed warning threshold value Dm even immediately after the driver switches the auxiliary brake from the ON state to the OFF state, safety is secured by output of the lane departure warning.

1.4 Additional Remark

In this embodiment, a case in which the brake is the auxiliary brake is described. However, the brake may be a main brake (for example, a foot brake). In a case in which the brake is the main brake, the auxiliary brake in the aforementioned description may be replaced with the main brake.

The present application is based on a Japanese patent application (Japanese patent application no. 2017-057813) filed on Mar. 23, 2017, the contents of which are herein incorporated as a reference.

INDUSTRIAL APPLICABILITY

The present disclosure is not limited to a large vehicle such as a truck, and is applicable to various vehicles.

REFERENCE SIGNS LIST

10 Lane departure warning device
11 CCD camera
20 Electronic control unit
21 Image processing section
22 Boundary line detection section
23 Departure determination section
24 Detection section
25 Warning control section
30 Speaker 31 Display device
50 Vehicle
LA Traveling lane
WL Lane boundary line

What is claimed is:

1. A control device for a lane departure warning device that outputs a warning based on positional relationship between a vehicle and a lane boundary line, the control device for a lane departure warning device, comprising:
   a detection section that detects switching from an ON state to an OFF state of a brake; and
   a warning control section that changes a warning threshold value to a value at which the warning is less likely to be output compared to a case in which the detection section does not detect the switching, once the detection section detects the switching, the warning threshold value being to be compared with position information of the vehicle in determination as to whether or not the warning is output.

2. The control device for a lane departure warning device according to claim 1, comprising
   a departure determination section that determines departure of the vehicle from the lane boundary line, wherein
   the warning threshold value is a threshold value to be used for determination of the departure by the departure determination section.

3. The control device for a lane departure warning device, according to claim 2, wherein the warning control section controls such that the warning is output, when it is determined by the departure determination section that the vehicle has departed.

4. The control device for a lane departure warning device, according to claim 1, wherein a state in which the warning threshold value has been changed is maintained until predetermined time elapses from a time point of the switching.

5. The control device for a lane departure warning device, according to claim 1, wherein once the detection section detects the switching in a state in which the warning threshold value has been changed, the state in which the warning threshold value has been changed is maintained.

6. A vehicle, comprising the control device for a lane departure warning device, according to claim 1.

7. A lane departure warning control method performed in a vehicle, the lane departure warning control method for outputting a warning based on positional relationship between the vehicle and lane boundary line, the lane departure warning control method comprising:
   detecting occurrence of switching from an ON state to an OFF state of a brake; and
   changing a warning threshold value to a value at which the warning is less likely to be output compared to a case in which occurrence of the switching is not detected, in a case in which the occurrence of the switching is detected, the warning threshold value being to be compared with position information of the vehicle in determination as to whether or not the warning is output.

* * * * *